(12) United States Patent
Krohn (10) Patent No.: US 10,696,110 B2
(45) Date of Patent: Jun. 30, 2020

(54) TRAILER COUPLING HAVING A RECEIVING SLEEVE

(71) Applicant: WESTFALIA-AUTOMOTIVE GMBH, Rheda-Wiedenbrück (DE)

(72) Inventor: Gerald Krohn, Rheda-Wiedenbrück (DE)

(73) Assignee: WESTFALIA-AUTOMOTIVE GMBH (DE)

( * ) Notice: Subject to any disclaimer, the term of this patent is extended or adjusted under 35 U.S.C. 154(b) by 263 days.

(21) Appl. No.: 15/580,932

(22) PCT Filed: Jun. 16, 2016

(86) PCT No.: PCT/EP2016/063956
§ 371 (c)(1),
(2) Date: Dec. 8, 2017

(87) PCT Pub. No.: WO2016/202956
PCT Pub. Date: Dec. 22, 2016

(65) Prior Publication Data
US 2018/0162185 A1    Jun. 14, 2018

(30) Foreign Application Priority Data
Jun. 17, 2015 (DE) .................... 20 2015 103 207 U (51) Int. Cl.
*B60D 1/28* (2006.01)
*B60D 1/52* (2006.01)
(Continued)

(52) U.S. Cl.
CPC .............. *B60D 1/28* (2013.01); *B60D 1/075* (2013.01); *B60D 1/26* (2013.01); *B60D 1/52* (2013.01)

(58) Field of Classification Search
CPC ... B62D 1/28; B62D 1/26; B62D 1/52; B62D 1/075
See application file for complete search history.

(56) References Cited

U.S. PATENT DOCUMENTS

| 5,184,840 A | 2/1993 | Edwards |
|---|---|---|
| 5,277,448 A | 1/1994 | Colibert |

(Continued)

FOREIGN PATENT DOCUMENTS

| DE | 202012101729 | 5/2012 |
|---|---|---|
| DE | 102011009306 | 7/2012 |

(Continued)

OTHER PUBLICATIONS

International Search Report dated Sep. 19, 2016; International Application No. PCT/EP2016/063956 filed Jun. 16, 2016; ISA/EP.

(Continued)

*Primary Examiner* — Tony H Winner
(74) *Attorney, Agent, or Firm* — McDonald Hopkins LLC (57) ABSTRACT

The invention relates to a trailer coupling for a motor vehicle (11), in particular a passenger car, comprising a retainer (20), which is arranged on or can be fastened to the motor vehicle (11), and a retainer part (30), which can be detachably fastened to the retainer (20) and which has a retainer insertion projection (33) for inserting into a retainer insertion receptacle (24) of the retainer (20), wherein the retainer part (30) has an integrated locking device (70) having at least one locking body (71) and has an actuation body (73), which is supported in the retainer part (30) so as to be movable in order to actuate the at least one locking body (71) into a locking position (R), wherein the at least one locking body (71) interlockingly engages in a locking receptacle (72) on the retainer (20) in the locking position (R) and is moved out of the locking receptacle (72) in a detaching position (L), the retainer insertion projection (33) of the (Continued)

retainer part (30) therefore being interlockingly locked in the retainer insertion receptacle (24) of the retainer (20) in the locking position (R) of the at least one locking body (71) and being removable from the retainer insertion receptacle (24) of the retainer (20) in the detaching position (L), wherein the retainer part (30) is provided for forming a coupling arm (15), which has a coupling part (60) having a coupling element (65), in particular having a coupling ball, for coupling a load carrier (200) or a trailer, or is provided for directly coupling a load carrier (200). According to the invention, the retainer part (30) has a receiving sleeve (40) having a tubular coupling insertion receptacle (41) for inserting a coupling insertion projection (66; 266) of the coupling part (60) or of the load carrier (200).

35 Claims, 5 Drawing Sheets

(51) Int. Cl.
    *B60D 1/07*    (2006.01)
    *B60D 1/26*    (2006.01)

(56) References Cited

U.S. PATENT DOCUMENTS

| | | | |
|---|---|---|---|
| 5,908,201 A | 6/1999 | Van Vleet | |
| 6,089,431 A | 7/2000 | Heyworth | |
| 6,820,890 B2* | 11/2004 | Westerdale | B60D 1/52 280/507 |
| 2002/0084622 A1 | 7/2002 | Hansen | |
| 2002/0140206 A1 | 10/2002 | Lloyd | |
| 2003/0015856 A1 | 1/2003 | Hancock | |
| 2004/0021295 A1 | 2/2004 | Westerdale | |
| 2004/0222614 A1 | 11/2004 | Lindenman | |
| 2005/0167945 A1* | 8/2005 | Rimmelspacher | B60D 1/26 280/477 |
| 2005/0236808 A1 | 10/2005 | Lier | |
| 2006/0225264 A1 | 10/2006 | Mahidhara | |
| 2007/0138224 A1* | 6/2007 | Rimmelspacher | B60D 1/26 224/519 |
| 2009/0189368 A1* | 7/2009 | Smith | B60D 1/07 280/477 |
| 2010/0109286 A1* | 5/2010 | Visser | B60D 1/52 280/477 |
| 2011/0031718 A1* | 2/2011 | Di Parma | B60D 1/06 280/504 |
| 2013/0038040 A1 | 2/2013 | Di Parma | |
| 2014/0103618 A1* | 4/2014 | de Kock | B60D 1/52 280/491.3 |
| 2015/0083770 A1 | 3/2015 | Ziola | |
| 2019/0070917 A1* | 3/2019 | Nance | B60D 1/58 |

FOREIGN PATENT DOCUMENTS

| | | | | |
|---|---|---|---|---|
| DE | 102011009306 A1 | 7/2012 | | |
| DE | 202013009204 | 1/2015 | | |
| DE | 202013009204 U1 | 1/2015 | | |
| DE | 20 2013 009 204 U1 * | 2/2015 | ............... | B62D 1/52 |
| WO | WO2004/026598 | 4/2004 | | |

OTHER PUBLICATIONS

International Searching Authority, European Patent Office, International Search Report and Written Opinion for International App. No. PCT/US2018/058182 dated Feb. 11, 2019.

* cited by examiner

TRAILER COUPLING HAVING A RECEIVING SLEEVE

CROSS REFERENCE TO RELATED APPLICATIONS

This application is a 35 U.S.C. 371 national stage filing and claims priority to pending International Application No. PCT/EP2016/063956 filed on Jun. 16, 2016, entitled "TRAILER COUPLING HAVING A RECEIVING SLEEVE," which claims the benefit of Foreign Patent Application No. DE202015103207.2 filed on Jun. 17, 2015, each of the foregoing applications are incorporated by reference herein.

The invention relates to a trailer coupling for a motor vehicle, in particular a passenger car, comprising a retainer which is arranged on or can be fastened to the motor vehicle, and a retainer part, which can be detachably fastened to the retainer and which has a retainer insertion projection for inserting into a retainer insertion receptacle of the retainer, wherein the retainer part has an integrated locking device having at least one locking body and has an actuation body, which is supported in the retainer part so as to be movable in order to actuate the at least one locking body into a locking position, wherein the at least one locking body interlockingly engages in a locking receptacle on the retainer in the locking position and is moved out of the locking receptacle in a detaching position, wherein the retainer part is provided for forming a coupling arm, which has a coupling part having a coupling element, in particular a coupling ball, for coupling a load carrier or a trailer, or for directly coupling a load carrier.

A trailer coupling of this type is explained in DE 10 2011 009 306 A1. The known trailer coupling can be adapted to various requirements so that different coupling elements can be mounted, for example. However, the flexibility of the known trailer coupling is still not ideal.

The objective of the present invention is therefore to provide an improved trailer coupling.

In order to achieve this objective, provision is made in the case of the aforementioned type of trailer couplings that the retainer part has a receiving sleeve with a tubular coupling insertion receptacle for inserting a coupling insertion projection of the coupling part or of the load carrier.

The following is also part of the invention: trailer coupling for a motor vehicle, in particular a passenger motor vehicle, having a retainer arranged on or fastened to the motor vehicle and a coupling arm detachably fastened to the retainer, wherein the coupling arm comprises a retainer part with an insertion projection for insertion into a retainer insertion receptacle of the retainer and a coupling part with a coupling element, in particular a coupling ball, for coupling a load carrier or a trailer, or is provided for direct coupling of a load carrier, wherein the retainer part has an integrated locking device having at least one locking body and an actuation body, which is supported in the retainer part so as to be movable in order to actuate the at least one locking body into a locking position, wherein the locking body interlockingly engages in a locking receptacle on the retainer in the locking position and is moved out of the locking receptacle in a detaching position, the retainer insertion projection of the retainer part therefore being interlockingly locked in the retainer insertion receptacle of the retainer in the locking position of the at least one locking body and being removable from the retainer insertion receptacle of the retainer in the detaching position. Provision is made in the trailer coupling that the retainer part has a receiving sleeve with a tubular coupling insertion receptacle for inserting a coupling insertion projection of the coupling part or of the load carrier.

The coupling arm, i.e. the retainer part and the coupling part, can form parts of the trailer coupling.

It is also possible that the coupling part and the trailer coupling explained above form components of a system. Furthermore, it is possible that said system or a different system comprises firstly the trailer coupling according to claim 1 and secondly a load carrier and/or an adapter element of the load carrier which has the coupling insertion projection.

The advantage of this design is that the retainer part can be easily removed from the securely mounted retainer from the vehicle side, namely by releasing the locking device. The movable components of the locking device are arranged on the retainer part such that complicated and expensive installations on the motor vehicle are not necessary. No movable components of a locking device need to be fitted or installed on the motor vehicle for example. The retainer is generally hidden behind the vehicle bumper such that it is not directly accessible. If a locking device is then arranged directly on the motor vehicle in this region, Bowden cables, electrical cables or similar have to be fitted in a more circuitous manner, in the boot, for example, where corresponding handles or similar for actuating the locking device can be arranged. This is not the case with the invention.

Advantageously, all the movable components of the locking device are arranged on the retainer part, i.e. on a component of the coupling arm which can be removed from the retainer.

A manual actuation device, in particular on board the retainer part, is advantageous for actuating the at least one locking body. Preferably a turning knob, actuating lever or similar is provided for actuating the locking body. In any case, a manual actuation handle to actuate the locking device, in particular towards the release position, is advantageously a component of the coupling arm, in particular of the retainer part.

The receiving sleeve is suitable for fitting the most diverse coupling parts, but also a load carrier directly. A coupling part with a ball-shaped coupling element, namely a coupling ball, can be inserted into the receiving sleeve, for instance. A load carrier can be attached to the coupling element, however typically a trailer can be attached.

However, it is also possible that the coupling part itself has a receiving sleeve into which a load carrier can then be inserted for example.

Furthermore, it is possible that at least one coupling insertion projection is provided on a load carrier which can be inserted into the coupling insertion receptacle of the receiving sleeve. The retainer part according to the invention can therefore be inserted into the vehicle-side retainer as an intermediate piece to then enable fitting of a load carrier, the coupling insertion projection of which is inserted into the coupling insertion receptacle of the receiving sleeve. It is possible in this case that a trailer coupling according to the invention is provided approximately transversely centrally at the rear of the vehicle, for example, into which the load carrier can be inserted centrally so to speak. It is also possible, however, that two or more trailer couplings according to the invention are provided at the rear of the vehicle so that a load carrier with two supporting arms, on each of which a coupling insertion projection is provided, can be inserted into the respective receiving sleeve of the retainer part. The retainer parts are arranged on a carrier assembly at the same distance from the transverse centre of the motor vehicle.

It should be noted at this point that a carrier assembly, in particular a cross member, to which the vehicle-side retainer is fastened, can of course also form an integral part of the trailer coupling according to the invention.

In order that the coupling insertion projection cannot be pushed freely through the receiving sleeve, but stops there at a predefined insertion depth, an end stop is advantageously provided for a free front side of the coupling insertion projection on an internal cross section of the coupling insertion receptacle. The coupling insertion receptacle has a base against which the free front side of the coupling insertion projection strikes. The base can be a complete base forming the bottom area of the coupling insertion receptacle such that the coupling insertion receptacle is completely closed on the bottom side. It is also possible, however, that the base is only present in part, i.e. that a supporting element protrudes in the direction of the internal cross section of the coupling insertion receptacle and forms a partial base region there. Said supporting element then acts as an end stop.

A different version, also in combination with the above-mentioned version of the invention, advantageously makes provision that a stop is provided on the outer circumference of the coupling insertion projection for striking a free front side of the receiving sleeve. The stop on the outer circumference of the coupling insertion projection can be configured like a flange, for example. It is also possible, however, that the stop is formed by a protruding interlocking element, in particular a bolt or similar. The free front side of the receiving sleeve acting as a stop can be formed by the peripheral wall of the receiving sleeve for example. Consequently, the stop of the coupling insertion projection strikes the front side of the peripheral wall of the receiving sleeve.

Reinforcement or a dedicated stop on the front side of the receiving sleeve, in particular the peripheral wall thereof, is also advantageous as follows. It is possible that a flange projection, in particular a flange projection surrounding the free front side in a circular manner, is arranged on the free front side of the receiving sleeve to strike the coupling insertion projection.

The receiving sleeve can be formed by a tubular element. A sufficiently strong pipe or a sufficiently thick pipe wall are enough to guarantee the required stability.

An advantageous embodiment of the invention makes the provision that the receiving sleeve is reinforced by at least one reinforcing element. Reinforcing ribs or stiffening ribs are provided on a tubular body of the receiving sleeve, for example.

A preferred embodiment of the invention makes the provision that the receiving sleeve is reinforced by at least one reinforcing ring. The reinforcing ring acts as a stiffener. Advantageously, the reinforcing ring completely encloses the external perimeter of the receiving sleeve or a tubular piece or tubular body of the receiving sleeve. A reinforcing ring, which is configured only as a partial ring, i.e. does not enclose the entire external perimeter of the tubular piece or tubular body of the receiving sleeve, is also conceivable.

An advantageous embodiment makes the provision that the at least one reinforcing ring is arranged on a free front side of the receiving sleeve. Thus, reinforcement is provided exactly where the heaviest loading by the coupling part or the load carrier may occur. The reinforcing ring can display an additional function at this point, namely as a longitudinal stop for the coupling projection of the coupling part or load carrier.

Preferably, a locking arrangement is provided to lock the coupling insertion projection to the coupling insertion receptacle.

The locking arrangement advantageously comprises a locking element, for example a locking bar, bolt or similar, which can be inserted into a locking receptacle of the receiving sleeve or pushed through the locking receptacle.

It would be possible for example that the locking arrangement is configured similar to the one which is provided on the retainer insertion receptacle and the retainer insertion projection and is effective. However, the locking arrangement explained below is preferred.

The locking arrangement comprises, for example, a locking element, which can be inserted into a locking receptacle of the receiving sleeve or pushed through the locking receptacle. Advantageously, a plurality of locking receptacles, in particular push-through openings, are provided on the receiving sleeve. Pairs of push-through openings, which are located opposite each other or are flush with each other, are preferred so that the locking element can be pushed through said locking receptacles. The respective longitudinal ends of the locking element are angled or can be secured by a securing element, for example a circular cotter pin or similar.

A preferred embodiment of the invention makes the provision that locking receptacles are provided on the coupling insertion projection and the coupling insertion receptacle, which are flush with each other when the coupling insertion projection is inserted into the coupling insertion receptacle. The locking element can be pushed through the locking receptacle. A push-through opening is provided for the locking element on the coupling insertion projection, for example, which penetrates said push-through opening as well as further push-through openings provided as locking receptacles on the receiving sleeve. Thus, the coupling insertion projection can no longer be removed from the coupling insertion receptacle.

It is preferred if the coupling insertion receptacle and the coupling insertion projection have at least one anti-rotation contour for receiving the coupling insertion projection in the coupling insertion receptacle in a rotationally locked manner. An anti-rotation projection can be provided eccentric to the axis of insertion, for example. It is preferred if the coupling insertion receptacle and the coupling insertion projection have a polygonal cross section, for example a triangular or square cross section, in order to guarantee anti-rotation. A rectangular, in particular squarish cross section, is preferred. This means that corners or corner regions can be rounded so that the coupling insertion projection can be easily inserted into the coupling insertion receptacle.

The axis of insertion of the coupling insertion receptacle and the axis of insertion of the retainer insertion receptacle are advantageously angled, for instance at right-angles. However, angles deviating from a right angle, for example, angle of 80 or 110°, are also advantageous. In any case, the effective axes with which the coupling insertion receptacle and the coupling insertion projection on the one hand and the retainer insertion receptacle and retainer insertion projection on the other hand can be engaged or disengaged, are preferably angled relative to each other. An angle of 50°, for example, also ensures that an action of force, in the longitudinal direction of the vehicle, between the coupling insertion receptacle and the coupling insertion projection, does not act simultaneously as a force to pull the retainer insertion projection out of the retainer insertion receptacle.

A preferred embodiment of the invention, which is also shown in more detail in the drawings, makes the provision that an axis of insertion of the coupling insertion receptacle runs substantially in a horizontal direction. It is advantageous in the case of the retainer insertion receptacle and the retainer insertion projection if the axis of insertion runs substantially in a vertical direction. The vehicle-side retainer can thus be easily accommodated behind a bumper of the vehicle, for example, and the coupling part can be inserted into the vehicle-side retainer from below. Operation is easy and the arrangement is visually appealing.

It is possible that the receiving sleeve forms an integral part of the retainer part. It can be formed integrally by a retainer body of the retainer part, for example. The retainer body is a cast part or forged part, for example, on which the receiving sleeve is configured as a sleeve section.

An advantageous embodiment of the invention makes the provision that the receiving sleeve is detachably fastened to the retainer part, for example screwed, riveted or similar to the retainer part. The retainer part can thus be optionally provided with different receiving sleeves, for example, receiving sleeves with different cross sections. Fitting is simple and changeover is easy.

A preferred version of the invention makes the provision that the retainer part has a bifurcate attachment which holds the receiving sleeve. The receiving sleeve is pushed into the bifurcate attachment from below or from the front (depending on the position in which it is fitted on the vehicle). It can be secured or permanently fastened there using a screw and/or glued and/or welded or similar.

The bifurcate attachment can have prong-like arms or side arms, for example, which protrude downwards from the retainer insertion projection, i.e. towards the road (depending on the position in which it is fitted on the vehicle).

In other cases referred to above, if the receiving sleeve is pushed into the bifurcate attachment from the front, the bifurcate attachment has prong-like arms or legs protruding horizontally from the retainer insertion projection between which the receiving sleeve is accommodated.

It is advantageous if the attachment has side arms or legs against which walls, for example side walls, of the receiving sleeve rest.

In addition, it is advantageous if the attachment has a base against which the receiving sleeve rests.

The attachment for the receiving sleeve can also be ring-shaped so that the receiving sleeve can be inserted into the attachment.

It is advantageous in any case if a receiving space, which is defined by the attachment, accommodates a large part of the cross section of the receiving sleeve, while a smaller part of the cross section of the receiving sleeve protrudes from the attachment or is not accommodated in the receiving space.

The arms of the bifurcate attachment extend in a longitudinal direction away from a base of the attachment. A section of the receiving sleeve protruding from the arms is preferably shorter in relation to said longitudinal extension than a section of the receiving sleeve accommodated between the arms. In other words, it is advantageous if a larger part of the receiving sleeve in relation to a longitudinal extension of the arms of the attachment is arranged between the arms and a smaller part of the receiving sleeve protrudes from the arms.

It is advantageous in the case of a ring-shaped or bifurcate attachment, if provision is made that the receiving sleeve is supported on at least three sides of the attachment angled relative to each other.

The bifurcate attachment or also a ring-shaped attachment has prong-like arms or legs protruding from the retainer insertion projections of the retainer part.

The attachment, i.e. prong-like arms and legs, for example, preferably forms a single piece with the retainer insertion projection.

A preferred concept also makes provision that the receiving sleeve is arranged on the retainer insertion projection as below or a body of the retainer part, for example an arm body of the retainer part, which has the retainer insertion projection, has the following configuration:

Preferably provision is made that the receiving sleeve is arranged on the retainer insertion projection such that in the state of being mounted on the vehicle it protrudes from the retainer insertion projection towards a bumper of the motor vehicle and/or from the retainer insertion projection backwards contrary to a forward direction of travel of the motor vehicle.

Therefore, in the direction of travel of the motor vehicle, the receiving sleeve advantageously protrudes backwards from the retainer insertion projection. A substantially right-angled or L-shaped arrangement of retainer insertion projection and receiving sleeve is realised, for example. An insertion section or insertion arm of the load carrier or of the coupling part having the coupling insertion projection can be short, for example.

In the state of being mounted on the vehicle, the receiving sleeve advantageously protrudes from a bumper or rear end of the motor vehicle.

Furthermore, it is advantageous if an insertion opening of the receiving sleeve in the state of being mounted on the vehicle protrudes backwards and/or freely from a bumper of the vehicle. This measure means that the coupling part or the load carrier can be easily inserted into the receiving sleeve.

Advantageously, the retainer part can also have multiple parts and a base part as well as a receiving part, which can be connected to each other using flange parts. The flange parts support each other with supporting surfaces and can be screwed together by means of a screw assembly.

The receiving part can be fitted on the base part preferably at at least two different distances in relation to a road surface. The supporting surfaces or at least one supporting surface, advantageously the supporting surface of the flange part of the base part, have in terms of the longitudinal extension thereof such a length that the respective other flange part can be fitted on said flange part in two longitudinal mounting positions, and the receiving sleeve or that the receiving part bearing the receiving sleeve can be fitted on the base part at at least two different distances from a road surface.

Advantageously, provision is made that the receiving sleeve is supported on the rear side thereof by a flange part opposite to an insertion opening for the coupling insertion projection.

Example embodiments of the invention are explained below by means of drawings.

A trailer coupling 10 is attached to a motor vehicle 11 by means of a carrier assembly 12, for example. The carrier assembly 12 comprises a cross member 13, which extends transverse to the longitudinal direction of the motor vehicle 11 at the rear or behind the rear end 14 of the motor vehicle 11. A retainer 10 is arranged on the cross member 13, which is screwed, welded or firmly attached to the cross member 12 [sic] in another manner. The cross member 13 is fastened to the motor vehicle 11, in particular the bodywork thereof, or screwed thereto by means of side bars or fastening console (not shown).

The cross member 13, in particular in combination with the side bars and/or fastening consoles, and the carrier assembly 12 can form parts of the trailer coupling 10 according to the invention.

The retainer 20 serves to retain a coupling arm 14, which is detachably fastened to the retainer 20. The retainer 20 has a tubular body 12, for example, on the receiving end 22 of which an insertion opening 23 of a retainer insertion receptacle 24 is provided. The coupling arm 15 with an insertion projection 33 can be inserted into the retainer insertion receptacle 24.

The vehicle-side retainer 20 is advantageously hidden behind a bumper 16 of the motor vehicle 11. The coupling arm 15 protrudes into the free area behind the rear end 14 or the bumper 16 so that a trailer can be coupled or a load carrier can be fitted onto the coupling arm 15.

The coupling arm 15 is in two parts, wherein it has a retainer part 30 for fastening to the vehicle-side retainer 20 as well as a coupling part 60 with a coupling element 65, for example a coupling ball, for coupling a trailer or load carrier. However, in a different embodiment, an insertion receptacle or an insertion projection can also be provided as coupling element 65 for attaching a load carrier, in accordance with FIG. 7 for example.

In addition to its insertion projection 33, the retainer part 30 has positive locking contours 35 at the side, for example wedge-shaped positive locking projections for engaging in corresponding positive locking contours 25 of the retainer 20, for example, positive locking receptacles. The positive locking contours 25 fit with the positive locking contours 35, therefore also configured wedge-shaped here. The positive locking contours 25 are located directly next to the insertion opening 23, for example. Thus, the retainer part 30 is held on the retainer in a rotationally locked manner.

A locking device 70 is used to lock the retainer part 30 onto the retainer 20. The locking device 70 comprises at least one, preferably two or three locking bodies 71, for example balls or other positive locking elements. The locking body 71 engages in a locking receptacle or a plurality of locking receptacles 72 on the retainer 20. The locking receptacle or locking receptacles 72 are provided on a retaining body 86, which is accommodated in a receptacle 26 of the retainer 20.

The locking receptacles 72 and the locking receptacle 72 can of course also be provided directly on the retainer 20.

The locking bodies 71 are supported on the retainer part 30 so as to be movable, for example in guides 88. The locking bodies 71 can be displaced in the guides 88, which extend radially away from a channel 87, by an actuation body 73 radially outwards in the direction of the locking receptacle 72, for example a groove, in order to lock the retainer part 30 to the retainer 20.

The actuation body 73 is mounted on a longitudinal end of a bolt element 74, for example, which has a toothed rack portion 75 on the other longitudinal end region. The bolt element 74 is accommodated in the channel 87 in a longitudinally displaceable manner. The toothed rack portion 75 can be actuated by a gear pinion 76, for example. The gear pinion 76 can be rotated by means of a handle element 77, for example a hand wheel, in order to move the actuation body 73 in the direction of a release position L, in which the locking body 71 does not engage in the locking receptacle 72, or the locking position R, in which the locking body 71 engages in the locking receptacle 72. The locking position R is only shown in the drawing in relation to the actuation body 73, which in this case is moved further away from the gear pinion 76.

However, the locking device 70 only has to be actively actuated in the direction of the release position L while a spring arrangement with a spring 78 acts in the direction of the locking position R. This is retained firstly on a step 79 in the channel 87 and secondly on the actuating body 73 so that it is spring-loaded in the direction of the locking position R.

In the release position L, the locking device 70 can be retained by means of a securing device 80, which has an actuation lever 82, for example. The actuation lever 82 actuates a locking pin 81, which engages in a securing receptacle 85 on the bolt element 74 when this is moved into the release position L. The actuation lever 82 is spring-loaded by a spring 84, which acts on a lever arm of the actuation lever 82, in the direction of the securing position or the engagement position of the locking pin 81 in the securing receptacle 85. When the retainer part 30 is inserted into the retainer 20, the actuation lever 82 releases as it strikes the retainer 20. In doing so, it displaces the locking pin 81 from the securing receptacle 85 so that the spring 78 can actuate the actuation body 70 in the direction of the locking position R and the latter thus moves the locking body 71 into the locking receptacle(s) 72.

The retainer part 30 has an arm section 31, which is attached to the retainer insertion projection 33 by means of a curved section 32. The hand wheel or handle element 77 is arranged in the region of the curved section 32 for example.

The coupling part 60 can be attached to the retainer part 30. The coupling part 60 has an arm body 61, for example, on the free end region 63 of which a coupling element 65, for example a coupling ball, is to arranged. A coupling insertion projection 66 is located opposite the free end region 63. A curved section 64 of an arm body 61 of the coupling part 60 extends between the coupling insertion projection 66 and the free end region 63.

A receiving sleeve 40 is provided on the retainer part 30, which provides a coupling insertion receptacle 41. The coupling insertion projection 66 can be inserted into a free insertion opening 42 of the coupling insertion receptacle 41.

The coupling insertion receptacle 41 has a stop 43 against which the free end of the coupling insertion projection 66 strikes upon insertion into the coupling insertion receptacle 41. The stop 43 is provided by a stop element 47, for example, which protrudes from a peripheral wall 46 of the receiving sleeve 40 to the internal cross section 44 thereof.

The internal cross section 44 of the insertion opening 42 and the coupling insertion receptacle 41 is consistent with a cross section of the coupling insertion projection 66, for example rectangular in the present case, in particular squarish. In this case, corner regions, namely outer corners of the coupling insertion projection 66 as well as inner corners of the coupling insertion receptacle 41 are rounded so that the coupling part 60 can be easily inserted into the receiving sleeve 40. The polygonal inner cross section 44 and the external cross section of the coupling insertion projection 66 consistent therewith in an interlocking manner form an anti-rotation lock so that the coupling insertion projection 66 cannot be rotated in the coupling insertion receptacle 41.

A reinforcement ring 46 is arranged on a free front side 48 of the receiving sleeve 40. This is mounted on the receiving sleeve 40 as a separate component and fixed there, for example welded or glued. It is also possible, however, that a tubular element, from which the receiving sleeve 40 is formed, is flanged or crimped on its front end or front side 48 so that there is reinforcement in the region of the front side 48 in any case.

The receiving sleeve 40 is accommodated in an attachment 27 of the retainer 20. The attachment 27 is bifurcate and has side arms 28. An upper wall 49 of the receiving sleeve 40 is located at the base of the attachment 27. The arms 28 extend to side walls 50 of the receiving sleeve 40, approximately to a wall 51, which is opposite the wall 49, however not entirely.

Thus, a larger part of a cross section of the receiving sleeve 40 is accommodated between the arms 28 or in the attachment 27 than the receiving sleeve 40 protrudes from the arms 28.

The largest part of the receiving sleeve 40 or the largest cross section of the receiving sleeve 40 is accommodated in a receiving space 29 of the attachment 27.

In relation to a longitudinal extension LE of the arms 28, the receiving sleeve 40 only protrudes slightly from the arms 28 and is accommodated mostly between the arms 28.

The arms 28 are wider in the region of the base of the attachment 27, but narrower at the free end regions thereof. The arms 28 therefore taper away from the base of the attachment 27.

The attachment 27 and the retainer insertion projection 33 are advantageously configured as a single piece. For example, the attachment 27 forms a single piece with the arm section 31, which in turn forms a single piece with the curved section 32 and the retainer insertion projection 33. The attachment 27 and the retainer insertion projection 33 are provided on a body 36, for example an arm body, of the retainer part 30. The body 36 is preferably a cast part or forged part.

The receiving sleeve 40 advantageously comprises a tubular body or is formed by a tubular body.

The receiving sleeve 40 is glued, welded or secured in the attachment 27 by means of a screw assembly. A welded seam 27a is drawn in by way of example.

It would of course also be possible to provide a ring-shaped receptacle 127 for the receiving sleeve 40 instead of the attachment 27, which is indicated schematically in the drawings.

The coupling part 60 can be locked onto the retainer part 30 by means of a locking arrangement 90. Locking receptacles 91 opposite each other and flush with each other are located on the receiving sleeve 40, which are flush with a locking receptacle 92 of the coupling part 60 when the coupling insertion projection 66 thereof is inserted into the coupling insertion receptacle 41. A locking element 93, for example a bolt or similar, can then be inserted through the locking receptacles 91, 92 so that the coupling insertion projection 66 can no longer be removed along the axis of insertion S2 thereof along which it is inserted into the coupling insertion receptacle 41.

The locking arrangement 90 is easily accessible since it is provided on a section of the receiving sleeve 40 protruding from the retainer insertion projection 33.

Figure 1:
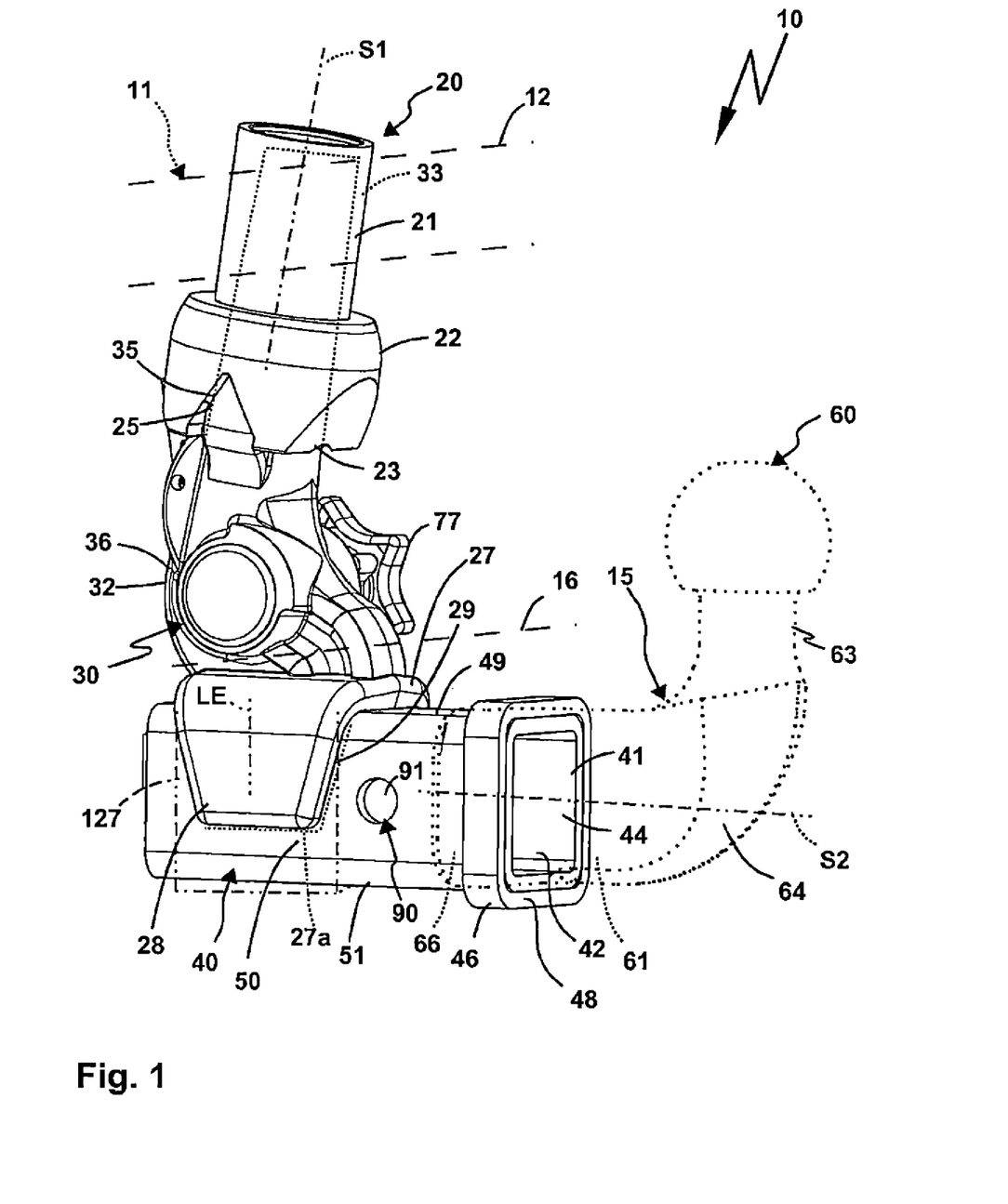
FIG. 1 shows a perspective oblique view of a trailer coupling according to the invention with an implied coupling part.
Figures 2, 3:
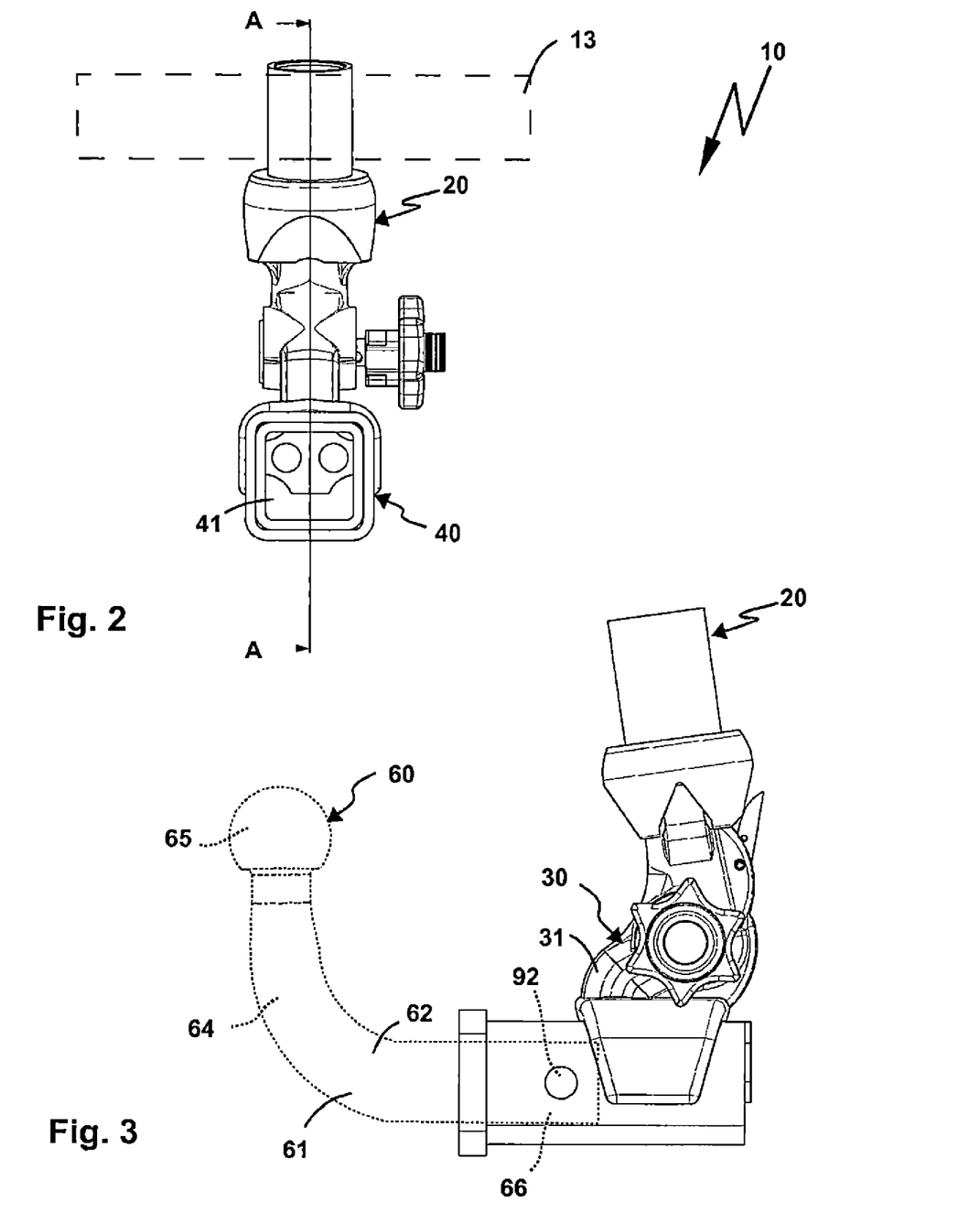
FIG. 2 shows a frontal view of the trailer coupling (viewing direction from the rear onto a vehicle)
FIG. 3 shows a side view of the trailer coupling.
Figure 4:
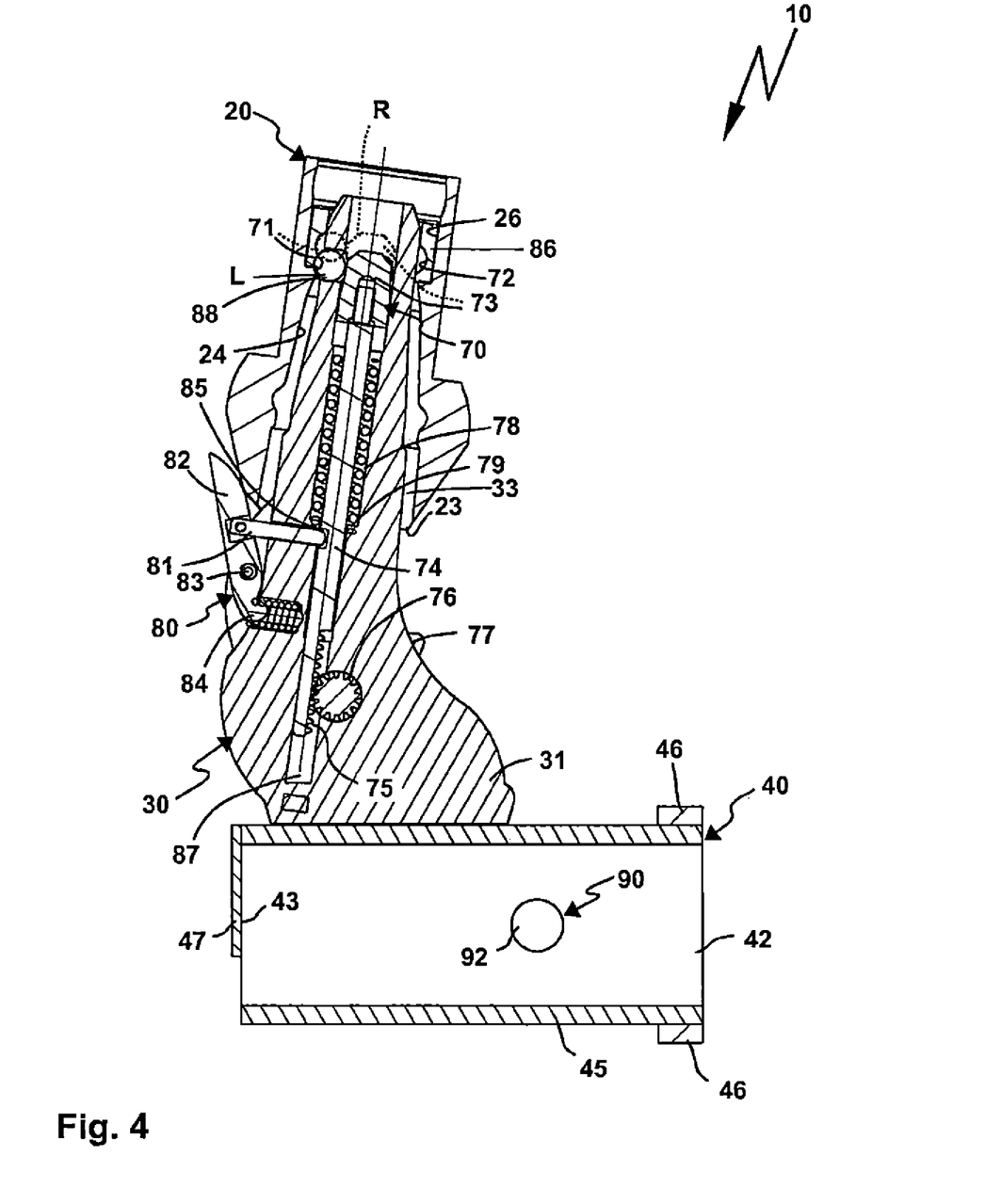
FIG. 4 shows a cross section through the trailer coupling according to FIG. 2 along a cutting line A-A in FIG. 2.

Furthermore, it is advantageous that the receiving sleeve 40 protrudes backwards from the retainer insertion projection 33 in the direction of travel of the motor vehicle 11, i.e. as shown in FIG. 1 advantageously protrudes backwards from the bumper 16 from the motor vehicle 11.

The locking receptacles of a trailer coupling according to the invention, for example the locking receptacles 91, 92 and/or an axis of insertion of the locking element therefore advantageously run transverse, in particular at right angles to, the axis of insertion along which the coupling insertion projection can be inserted into the coupling insertion receptacle or removed therefrom.

The locking element 93 has an insertion section 94 through which the locking receptacles 91, 92 are inserted. The locking element 93 can be gripped easily on the operating section 95. The operating section 95 and the insertion section 94 are angled relative to each other. A locking pin, cotter pin or similar can be provided on the side of the insertion section 94 opposite the operating section 95 in order to secure the locking element 93 in an optimum manner and ensure its unwanted removal (not shown in the drawings however).

Figure 5:
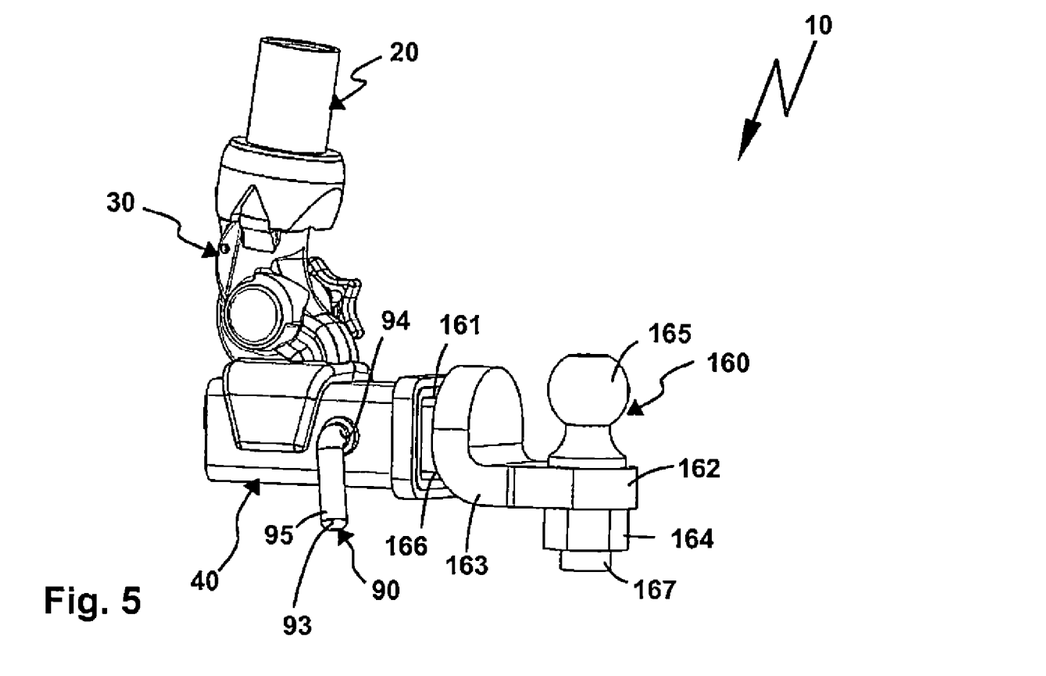
FIG. 5 shows a perspective oblique view of the trailer coupling corresponding approximately to FIG. 1, however with an alternative coupling part.

A coupling part 160 with its coupling insertion projection 166 can be inserted into the coupling insertion receptacle 41 instead of the coupling part 60. The coupling part 160 has a coupling carrier 163, for example, which has a protruding section 162. The section 162 is plate-shaped, for example. Thus, a bolt body 167, on the free ends of which a coupling element 165 is arranged, can be inserted through a push-through opening of the section 162. The region of the bolt body 167 protruding from the section 162 can be secured by means of a screw nut 164.

Figure 6:
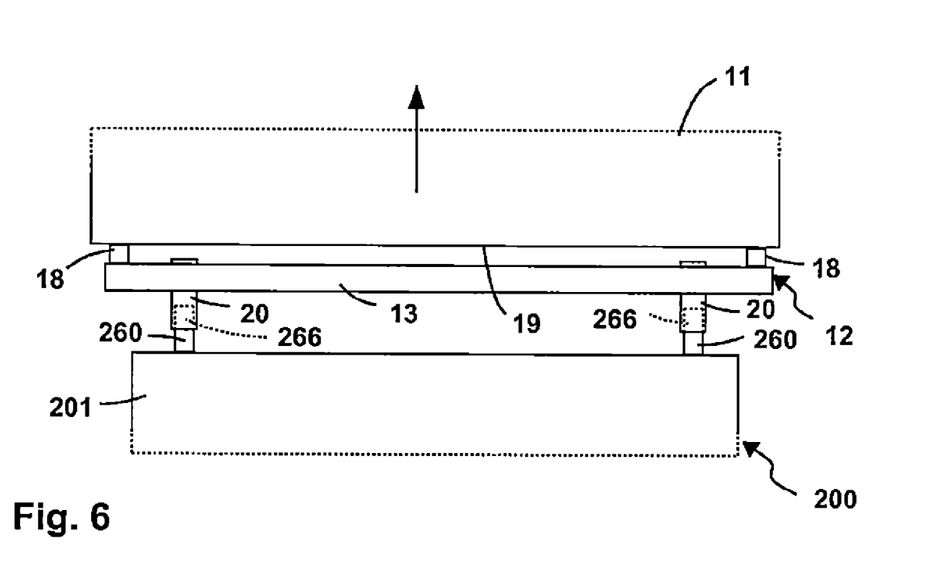
FIG. 6 shows a schematic top view onto a rear end of a motor vehicle with a carrier assembly, which has two trailer couplings according to the invention, on which a load carrier is fitted.

The inventive concept is shown in FIG. 6 by means of a load carrier 200. The load carrier 200 has coupling insertion projections 266, for example, which are arranged on the coupling parts 260 thereof.

Two retainers 20, for example, are arranged on a cross member 13, which extends transversally at the rear end 19 of the motor vehicle 11 and is fastened to side bars 18 on the motor vehicle 11. The retainers 20 are arranged on the rear end 19 of the motor vehicle 11 at a transverse distance. Retainer parts 30 are inserted into each retainer 20. The retainer parts 30 have coupling insertion receptacles 41 into which the coupling insertion projections 266 of the load carrier 200 can be inserted.

The axis of insertion S2 along which the coupling projections 66, 166, 266 can be inserted into the coupling insertion receptacle(s) 41, preferably runs in a substantially horizontal direction (in the use position of the motor vehicle 11). On the other hand, an axis of insertion S1, along which the retainer insertion projection 33 is to be inserted into the retainer insertion receptacle 24, preferably runs at an angle to the axis of insertion 82, preferably in a substantially vertical direction.

Figure 7:
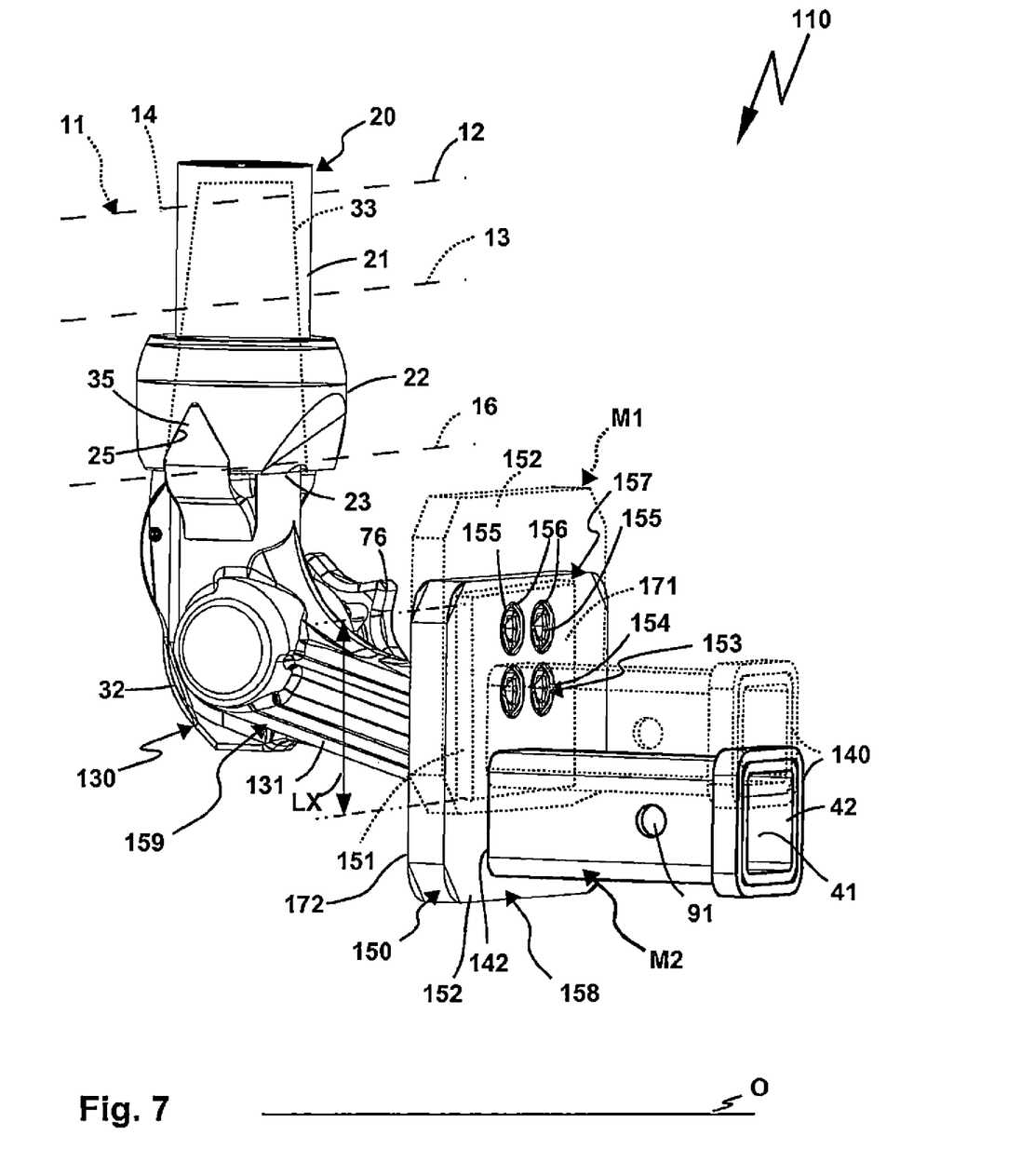
FIG. 7 shows a version of the trailer coupling according to the invention, wherein the receiving sleeve is fastened to the retainer part by means of a flange assembly.

A retainer part according to the invention can also have multiple parts as shown in FIG. 7 for example.

A retainer part 130 of a trailer coupling 110 corresponds substantially to the retainer part 30, but has no permanently fitted receiving sleeve, but rather a base part 159 and a receiving part detachably mounted on the base part 15 and supporting a receiving sleeve 140. An arrangement of flange plates 150 with a flange part 151 arranged on an arm section 131 of the retainer part 130 is provided for detachable fastening, which flange part provides a supporting surface on the front side thereof, on which a supporting surface of a flange part 152 is supported. A receiving sleeve 140 is arranged on a front side of the flange part 152 facing away from the flange part 151, which corresponds geometrically and functionally to the receiving sleeve 40, i.e. has a coupling insertion receptacle 41 for the coupling part 60 or 160 and also the coupling insertion projection 266.

The receiving sleeve 140 is on the rear side, i.e. supported on the flange part 152 on its rear side 142 facing away from the insertion opening 44.

The flange parts 150, 152 are screwed together by means of a screw assembly 157. The screw assembly 157 comprises screws 156, for example, which can be optionally screwed into screw receptacles 154 or screw receptacles 155 on the flange part 151. Thus, the flange part 152 can be fitted in at least two different longitudinal fitting positions M1 and M2 so that the receiving sleeve 40 and thus also the coupling insertion receptacle 41 have the same different distances from a road surface O. A longitudinal extension LX of the flange part 151 and/or 152 is sufficiently long that the supporting surfaces 171, 172 of the flange parts 151, 152 can support each other two-dimensionally and to a sufficient extent in both longitudinal fitting positions M1 and M2.

It is clear that this design is also ideal for fastening the load carrier 200 at different heights relative to the road surface O. Thus, the retainer part 130 could be used instead of the retainer part 30 in the arrangement according to FIG. 6 so that the load carrier 200 can be mounted on the motor vehicle 11 at different distances from the road surface O.

The invention claimed is:

1. A trailer coupling for a motor vehicle (11), comprising a retainer (20) which is fastenable to the motor vehicle (11), and a retainer part (30), which is detachably fastenable to the retainer (20) and which has a retainer insertion projection (33) for inserting into a retainer insertion receptacle (24) of the retainer (20), wherein the retainer part (30) has an integrated locking device (70) having at least one locking body (71) and an actuation body (73), which is supported in the retainer part (30) so as to be movable in order to actuate the at least one locking body (71) into a locking position (R), wherein the at least one locking body (71) interlockingly engages in a locking receptacle (72) on the retainer (20) in the locking position (R) and is moved out of the locking receptacle (72) in a releasing position (L), so that the retainer insertion projection (33) of the retainer part (30) is interlockingly engaged in the retainer projection receptacle (24) of the retainer (20) in the locking position (R) of the at least one locking body (71) and in the releasing position (L) is removable from the retainer insertion receptacle (24) of the retainer (20), wherein the retainer part (30) is provided for forming a coupling arm (15), which has a coupling part (60) having a coupling element (65), for coupling a load carrier (200) wherein the retainer part (30) has a receiving sleeve (40) with a tubular coupling insertion receptacle (41) for inserting a coupling insertion projection (66; 266) of the coupling part (60) or of the load carrier (200), wherein the retainer part (30) has a bifurcated or ring-shaped attachment (27, 127) which holds the receiving sleeve (40).

2. A trailer coupling according to claim 1, wherein the receiving sleeve (140) is supported on the rear side (142) thereof facing away from an insertion opening (42) for the coupling insertion projection (66) by a flange part (152) attached to the retainer part (30).

3. A trailer coupling according to claim 1, wherein the attachment (27, 127) has arms (28) on the sides against which walls of the receiving sleeve (40) rests.

4. A trailer coupling according to claim 1, wherein the receiving sleeve (40) rests on a base of the attachment (27, 127) from which the arms (28) protrude.

5. A trailer coupling according to claim 1, wherein the receiving sleeve (40) is supported on at least three sides of the attachment (27, 127) angled relative to each other.

6. A trailer coupling according to claim 1, wherein the arms (28) of the attachment (27) taper towards the free ends thereof.

7. A trailer coupling according to claim 1, wherein in relation to a longitudinal extension (LE) of the arms (28) of the attachment (27) a section of the receiving sleeve (40) protruding from the arms (28) is shorter than a section of the receiving sleeve (40) accommodated between the arms (28).

8. A trailer coupling according to claim 1, wherein a larger cross section of the receiving sleeve (40) is accommodated in a receiving space (29) defined by the attachment (27) than protrudes from the receiving space (29).

9. A trailer coupling according to claim 1, wherein the retainer insertion projection (33) and the attachment (27, 127) are formed as an integral body.

10. A trailer coupling according to claim 1, wherein the at least one locking body (71) comprises a ball or a rolling element or is formed thereby.

11. A trailer coupling according to claim 1, wherein the receiving sleeve (40) is arranged on the retainer insertion projection (33) or the retainer part (30) such that in a state of being assembled on the motor vehicle (11) the receiving sleeve (40) protrudes from the retainer insertion projection (33) towards a bumper (16) of the motor vehicle (11).

12. A trailer coupling according to claim 1, wherein the receiving sleeve (40) is arranged on the retainer insertion projection (33) or the retainer part (30) such that it protrudes backwards from the retainer insertion projection (33) counter to a forward direction of travel of the motor vehicle (11).

13. A trailer coupling according to claim 1, wherein the receiving sleeve (40) is arranged on the retainer insertion projection (33) or the retainer part (30) such that it protrudes from the bumper (16) or a rear end (14) of the motor vehicle (11).

14. A trailer coupling according to claim 1, wherein the coupling insertion receptacle (41) has an end stop protruding into an internal cross section (44) thereof for a free front side of the coupling insertion projection (66; 266) or that a flange stop is provided on the outer circumference of the coupling insertion projection (66; 266) for striking a free front side (48) of the receiving sleeve (40).

15. A trailer coupling according to claim 14, wherein a flange projection for striking the coupling insertion projection (66; 266) is arranged on a free front side (48) of the receiving sleeve (40).

16. A trailer coupling according to claim 1, wherein the receiving sleeve (40) is reinforced by at least one reinforcing element.

17. A trailer coupling according to claim 16, wherein the at least one reinforcing element (46) comprises a reinforcing ring (46) arranged on the free front side (48) of the receiving sleeve (40).

18. A trailer coupling according to claim 1, wherein the coupling insertion projection (66; 266) can be locked to the coupling insertion receptacle (41) by means of a locking arrangement (90).

19. A trailer coupling according to claim 18, wherein the locking arrangement (90), is arranged on a section of the 20. A trailer coupling according to claim 18, wherein the locking arrangement (90) has a locking element (93), which is insertable into a locking receptacle (91) of the receiving sleeve (40) or can be pushed through the locking receptacle (91).

21. A trailer coupling according to claim 18, wherein the locking arrangement (90) has a locking element (93), which is pushable through locking receptacles (91, 92), which are provided on the coupling insertion projection (66; 266) and the coupling insertion receptacle (41) and are flush with each other when the coupling insertion projection (66; 266) is inserted into the coupling insertion receptacle (41).

22. A trailer coupling according claim 1, wherein the coupling insertion receptacle (41) and the coupling insertion projection (66; 26) have at least one anti-rotation contour to receive the coupling insertion projection (66; 266) in the coupling insertion receptacle (41) in rotationally-locked manner.

23. A trailer coupling according to claim 1, wherein an axis of insertion of the coupling insertion receptacle (41) and an axis of insertion (S1) of the retainer insertion receptacle (24) of the retainer (20) are angled relative to each other.

24. A trailer coupling according to claim 1, wherein an axis of insertion (S2) of the coupling insertion receptacle (41) runs substantially horizontal or an axis of insertion (S1) of the retainer insertion receptacle (24) runs substantially vertical.

25. A trailer coupling according to claim 1, wherein the actuation body (73) fits in a channel (87) so as to be displaceable lengthways in order to move the at least one locking body (71) between the releasing position (L) and the locking position (R).

26. A trailer coupling according to claim 1, wherein wedge-shaped positive locking contours are provided on the retainer part (30) and the retainer (20), which engage when the retainer insertion projection (33) engages with the retainer insertion receptacle (24).

27. A trailer coupling according to claim 26, wherein the retainer insertion projection (33) protrudes advantageously from the positive locking contours (35) in the direction of insertion and is substantially cylindrical.

28. A trailer coupling according to claim 1, wherein a manual actuation element (77) is arranged on the retainer part (30) for moving the actuation body (73) towards the releasing position (L) or the locking position.

29. A trailer coupling according to claim 1, wherein the actuation body (73) or the at least one locking element is loaded by a spring arrangement in a direction of the locking position (R).

30. A trailer coupling according to claim 1, wherein the actuation body (73) comprises a bolt element (74) or is formed thereby.

31. A trailer coupling according to claim 1, wherein the retainer part (30) has a base part (159) and a receptacle part (158) supporting the receiving sleeve (40), on which a flange part (151, 152) is arranged, wherein the flange parts (151, 152) support each other with supporting surfaces (171, 171) and is attachable together by means of a screw assembly.

32. A trailer coupling according to claim 31, wherein the flange parts (151, 152) are detachably fitted in at least two different longitudinal fitting positions (M1, M2) relative to a longitudinal extension (LX) of the supporting surfaces (171, 172) thereof so that the receiving part (158) supporting the receiving sleeve (158) fits on the base part (159) at, at least two different distances from a road surface (O).

33. A trailer coupling for a motor vehicle (11), comprising a retainer (20) which is-fastenable to the motor vehicle (11), and a retainer part (30), which is detachably fastenable to the retainer (20) and which has a retainer insertion projection (33) for inserting into a retainer insertion receptacle (24) of the retainer (20), wherein the retainer part (30) has an integrated locking device (70) having at least one locking body (71) and an actuation body (73), which is supported in the retainer part (30) so as to be movable in order to actuate the at least one locking body (71) into a locking position (R), wherein the at least one locking body (71) interlockingly engages in a locking receptacle (72) on the retainer (20) in the locking position (R) and is moved out of the locking receptacle (72) in a releasing position (L), so that the retainer insertion projection (33) of the retainer part (30) is interlockingly engaged in the retainer projection receptacle (24) of the retainer (20) in the locking position (R) of the at least one locking body (71) and in the releasing position (L) is removable from the retainer insertion receptacle (24) of the retainer (20), wherein the retainer part (30) is provided for forming a coupling arm (15), which has a coupling part (60) having a coupling element (65), for coupling a load carrier (200) wherein the retainer part (30) has a receiving sleeve (40) with a tubular coupling insertion receptacle (41) for inserting a coupling insertion projection (66; 266) of the coupling part (60) or of the load carrier (200), wherein the receiving sleeve (40) is welded, glued or screwed to a bifurcate or ring-shaped attachment (27, 127) of the retainer part (30) accommodating the receiving sleeve (40).

34. A trailer coupling for a motor vehicle (11), comprising a retainer (20) which is-fastenable to the motor vehicle (11), and a retainer part (30), which is detachably fastenable to the retainer (20) and which has a retainer insertion projection (33) for inserting into a retainer insertion receptacle (24) of the retainer (20), wherein the retainer part (30) has an integrated locking device (70) having at least one locking body (71) and an actuation body (73), which is supported in the retainer part (30) so as to be movable in order to actuate the at least one locking body (71) into a locking position (R), wherein the at least one locking body (71) interlockingly engages in a locking receptacle (72) on the retainer (20) in the locking position (R) and is moved out of the locking receptacle (72) in a releasing position (L), so that the retainer insertion projection (33) of the retainer part (30) is interlockingly engaged in the retainer projection receptacle (24) of the retainer (20) in the locking position (R) of the at least one locking body (71) and in the releasing position (L) is removable from the retainer insertion receptacle (24) of the retainer (20), wherein the retainer part (30) is provided for forming a coupling arm (15), which has a coupling part (60) having a coupling element (65), for coupling a load carrier (200) wherein the retainer part (30) has a receiving sleeve (40) with a tubular coupling insertion receptacle (41) for inserting a coupling insertion projection (66; 266) of the coupling part (60) or of the load carrier (200), wherein the receiving sleeve (40) is detachably fastened to the retainer part (30).

35. A trailer coupling for a motor vehicle (11), comprising a retainer (20) arranged on or fastened to the motor vehicle (110), and a coupling arm detachably fastened to the retainer (20) wherein the coupling arm has a retainer part (30) with a retainer insertion projection (33) for inserting into a retainer insertion receptacle (24) of the retainer (20) and a coupling part (60) with a coupling element (65), for coupling a load carrier (200) wherein the retainer part (30) has an integrated locking device (70) having at least one locking body (71) and an actuation body (73), which is supported in the retainer part (30) so as to be movable in order to actuate the at least one locking body (71) into a locking position (R), wherein the locking body (71) interlockingly engages in a locking receptacle (72) on the retainer (20) in the locking position (R) and is moved out of the locking receptacle (72) in a releasing position (L), so that the retainer insertion projection (33) of the retainer part (30) is interlockingly engaged in the retainer projection receptacle (24) of the retainer (20) in the locking position (R) of the at least one locking body (71) and in the releasing position (L) is removable from the retainer insertion receptacle (24) of the retainer (20) wherein the retainer part (30) has a receiving sleeve (40) with a tubular coupling insertion receptacle (41) for inserting a coupling insertion projection (66; 266) of the coupling part (60) or of the load carrier (200), wherein the receiving sleeve (40) is integrally formed with the retainer part (30).

\* \* \* \* \*